Fig. 1

INVENTOR
NORMAN B. MEARS
BY Marvin Jacobson
ATTORNEY

Fig. 2

April 11, 1967  N. B. MEARS  3,313,225
AUTOMATIC MULTIPLE PHOTOPRINTING SYSTEM
Filed Aug. 7, 1964  5 Sheets-Sheet 3

INVENTOR
NORMAN B. MEARS
BY Marvin Jacobson
ATTORNEY

April 11, 1967 N. B. MEARS 3,313,225
AUTOMATIC MULTIPLE PHOTOPRINTING SYSTEM
Filed Aug. 7, 1964 5 Sheets-Sheet 5

INVENTOR
NORMAN B. MEARS
BY *Marvin Jacobson*
ATTORNEY

United States Patent Office 3,313,225
Patented Apr. 11, 1967

3,313,225
AUTOMATIC MULTIPLE PHOTOPRINTING SYSTEM
Norman B. Mears, St. Paul, Minn., assignor to Buckbee-Mears Company, St. Paul, Minn., a corporation of Minnesota
Filed Aug. 7, 1964, Ser. No. 388,077
16 Claims. (Cl. 95—75)

This invention relates generally to the manufacture of precision articles from continuous sheets of thin metallic webbing, utilizing photographic techniques. In particular this invention is directed toward apparatus for automatically photoprinting the desired precision patterns onto the metallic webbing and for advancing the continuous webbing through the photoprinting stations.

Briefly, the process of manufacturing articles from thin metallic webbing, with which this invention is concerned, includes the steps of: initially preparing the webbing by scrubbing and cleaning; coating both sides of the webbing by applying a light-sensitive enamel or resist; photoprinting the desired pattern onto the coated surfaces of the webbing by subjecting them to actinic light through a photographic master negative or positive; removing the unexposed parts of the resist; etching away those sections of the webbing not covered by the resist, and finally another scrubbing, cleaning and drying of the webbing. Details of these various process steps and apparatus at the processing stations for putting into practice these methods are described in a series of patents and patent applications. In particular, Patent No. 2,814,975, issued to Norman B. Mears, patent aplication Ser. No. 314,222 by Silas A. Brown, filed Oct. 7, 1963, titled "Photoprinting Apparatus" describe in greater detail the steps in the photoprinting process and apparatus comprising a photoprinting station. As more fully described therein, a pair of photographic glass masters containing images of the patterns to be printed are respectively mounted in correspondnig front and back photoprinting frames which are pivotally connected to one another. Metallic webbing which is coated with the light sensitive resist on both sides is drawn between the separated frames and stopped when in the desired position. The frames are then brought together so that the master negatives are in contact with the respective surfaces of the webbing. This section of the webbing is then exposed to suitable actinic light for a predetermined period of time on both sides simultaneously while the glass masters are held in registration to one another to photoprint the respective patterns onto the webbing. After a suitable exposure time, the frames are separated and the webbing drawn through to position a new section of webbing for photoprinting. Subsequently all of the exposed sections of webbing are subjected to an etching process to form the desired patterns. It is a general object of this invention to provide means for automatically controlling the photoprinting of a continuous sheet of metallic webbing.

It is a more specific object of this invention to provide means for automatically controlling the photoprinting of a continuous sheet of metallic webbing with a minimum waste in time and material.

Still another object of this invention is to provide a system which incorporates automatic multiple photoprinting stations (AMPS).

Still another object of this invention is to achieve optimum conditions of speed of operation and use of floor space and minimum waste of material for automatic multiple photoprinting station system.

Yet another object of this invention is to provide an automatic multiple photoprinting station which requires a minimum amount of maintenance and manual intervention.

A still further object of this invention is to provide a system incorporating automatic multiple photoprinting stations which are readily adaptable for incorporation into a completely automated line for producing precision articles from thin metallic webbing.

Still a further object of this invention is to provide an automatic photoprinting system for use in producing precision articles wherein the desired pattern can be quickly and economically changed.

Each of the automatic photoprinting stations of this invention comprises a pair of photoprinting frames containing images of the patterns to be printed and which are pivotally mounted to one another. Means are provided to swing the frames away from one another to allow insertion therebetween of the metallic webbing. Means are also provided to mechanically close the frames and to draw the master images into contact with the corresponding surfaces of the webbing. Each station further includes sources of actinic light for photoprinting the desired circuit patterns onto the webbing after the drawndown is complete. In one embodiment three identical photoprinting stations are located in spaced apart relationship along the direction of travel of the webbing and control means are provided to operate each of the stations concurrently and to advance the webbing through the photoprinting stations in an intermittent stop and go manner, respectively corresponding to the alternate steps of photoprinting followed by advancing or drawing through. The dimensional spacing between the frames in adjacent photoprinting stations is selected such that as the continuous webbing is intermittently exposed and advanced therethrough, the webbing at the output contains the desired circuit patterns printed on contiguous sections. The spacing and advancing speed are selected to optimize the efficiency of operation of the system.

These and other features and advantages will become apparent during the course of the following description with reference to the accompanying drawings in which.

Figure 1:
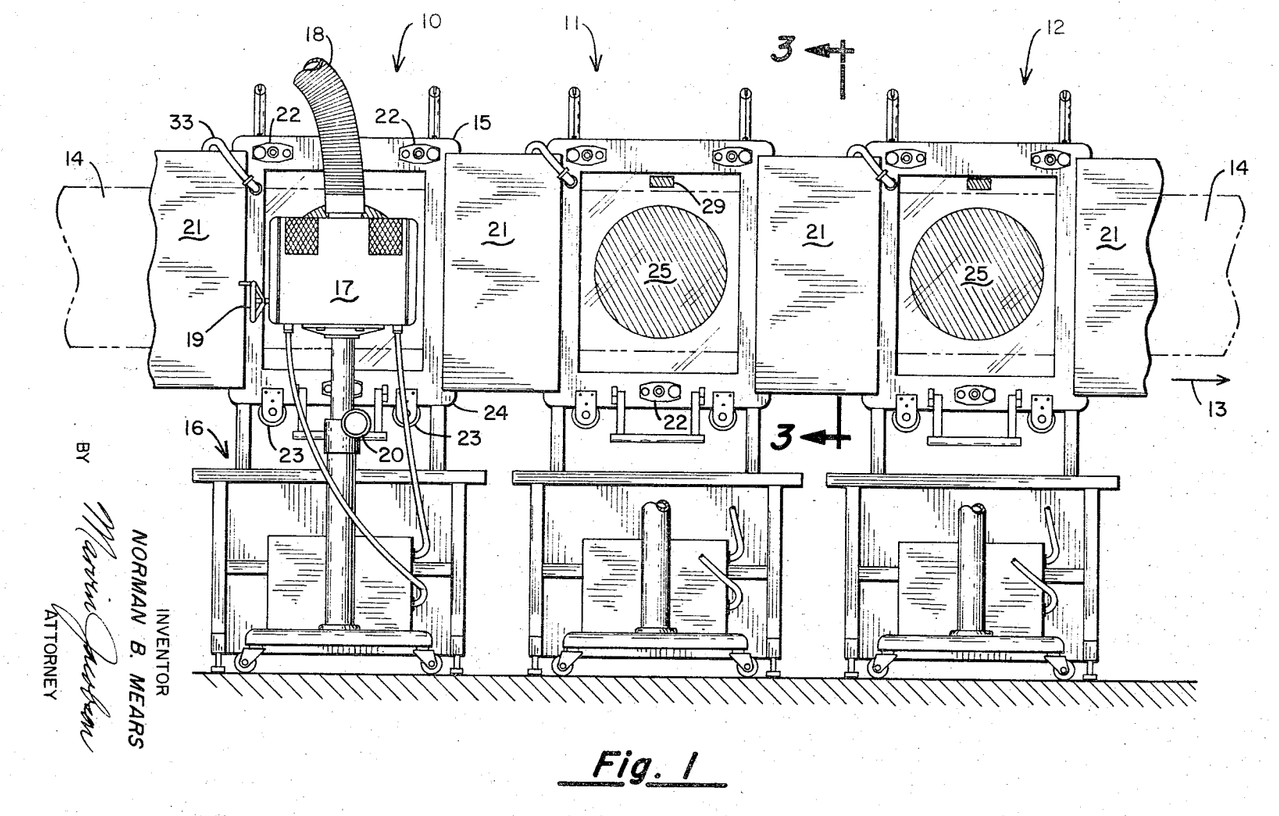
FIGURE 1 is a general layout illustration of a three station system embodiment of this invention.
Figure 2:
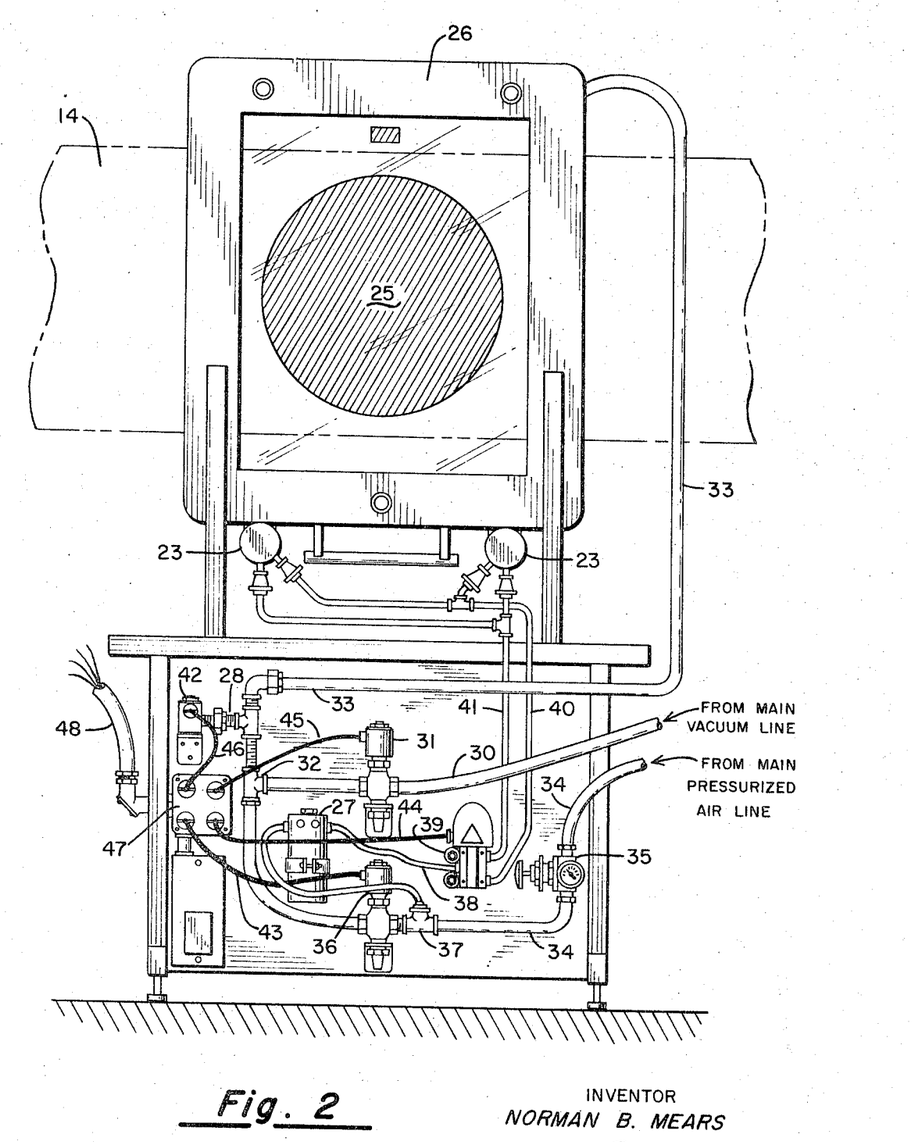
FIG. 2 is a somewhat enlarged rear view of a single station of FIG. 1, showing in some detail the hydraulic and electrical-control lines.

The automatic multiple photoprinting station apparatus illustrated in FIG. 1 as an embodiment of this invention comprises three identical photoprinting stations 10, 11 and 12 which are spaced apart a predetermined distance along the line of travel, shown by arrow 13, of a continuous sheet of metallic webbing 14 shown in dashed line. Each of the stations includes photoprinting frames 15 mounted on supporting stands 16 and a carbon arc lamp 17 suitably mounted on a support. For clarity the carbon arc lamp is shown only at one of the three stations. Exhaust tubing 18 to remove the burned away carbon is provided for each of the lamps. The hand adjustable wheels, such as shown at 19 and 20, provide means for adjusting the lamp to the suitable operating position. As will be subsequently described more fully and as illustrated in FIG. 2, hydraulic and electric lines for control and operation of the station are mounted at the rear of the stations.

Since the sheets of continuous webbing 14 stretches from left to right through the station, there are curtains or shades 21 extending to the right and left of each of the stations which are suitably mounted to the frame to prevent exposure of the webbing to extraneous light. The photoprinting frames 15 are described in detail in copending application Ser. No. 314,222 titled Photoprinting Apparatus by Silas A. Brown, filed Oct. 7, 1963. As described in greater detail in said application, there is a front and back frame 24 and 26 respectively, each encasing a glass master photographic plate which carries a negative or positive image of a pattern, 25, to be photoprinted on the photo-sensitized webbing 14. Each of the plates further carries a registration block 29 for use in properly adjusting and aligning the masters to one another for precise orientation of the patterns to be photoprinted on opposite sides of the webbing. The front and back frames are coupled to each other by ball and socket joints such as illustrated at 22 which include means for making the adjustment for proper registration. The front and back frames are hinged together by the top ball-socket joints so that the front frame can be swung forward away from the rear frame while pivotally attached to the top to allow the webbing to be inserted and withdrawn between the frames while still maintaining alignment. The ball-socket joints maintain the accurate registration of the front and rear frames for many cycles of operation during which the frames are repetitively and periodically swung open and closed. The inner facing planes of the two frames include gaskets and grooves to which a vacuum is applied in order to draw the two frames closely together so that the glass masters are in contact with their corresponding surfaces of the webbing during the exposure time. After exposure, the frames are swung open by release of the vacuum and by the forward drive action of the air cylinders 23.

It has been found important to provide a relatively constant temperature in the area of the frames 15 to ensure that there is no shift in registration and no cracking of the glass masters due to differences in the coefficient of expansion of the various materials. Preferably, fresh cooling air is directed toward the frames by means not shown to maintain a suitable temperature level.

Figure 3:
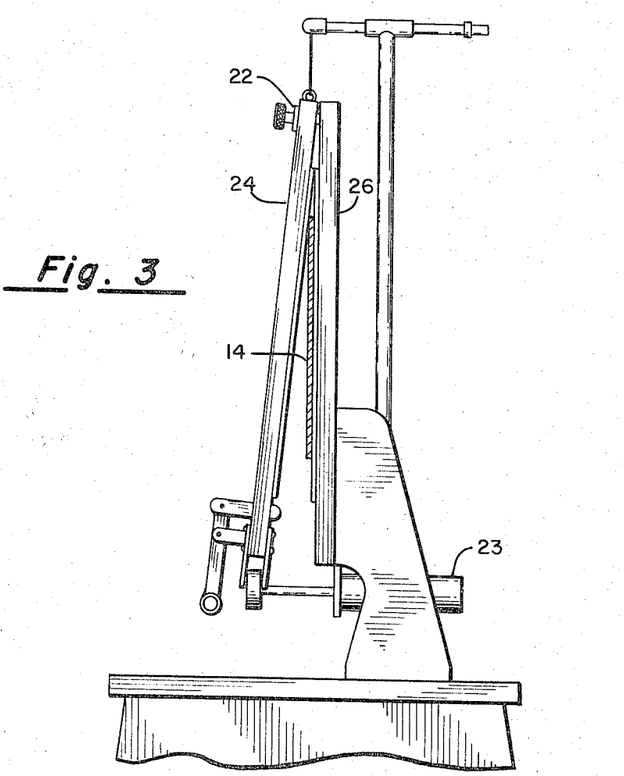
FIG. 3 is a view taken along line 3—3 of FIG. 1, showing the frames of one of the stations swung apart while the webbing is advancing therethrough.

One cycle of operation of one of the stations will now be described. It will be assumed that previous to the start of operation the registration blocks 29 on the glass masters in the front and back frames respectively have been brought into proper alignment or registration with one another by suitable adjustment of the adjusting handles at the respective ball-socket joints 22. For illustrative purposes the start of the cycle of operation can be considered to occur when the air cylinders 23 are in the forward position. At the start, the front frame 24 is swung away at the bottom from the back frame 26, as shown in FIG. 3. The two frames are suitably hinged together by the upper ball-socket joints 22 in a manner to allow the front frame to swing open a sufficient degree to allow the insertion of the sheet of metallic webbing 14 between the frames. The sheet of webbing 14 is fed into the system from a supply reel, not shown, located at the left of station 10 and coiled onto a motor-driven take-up reel, not shown, located at the right of station 12. The latter is, of course, intermittently driven and its controls will be subsequently described in greater detail. Prior to being coiled on the supply reel, the metallic webbing is subjected to a suitable treatment process to coat it with a light sensitive material, for example, in the manner as described in the Mears Patent No. 2,710,814. Although for illustrative purposes the metallic webbing is considered to be coiled on a supply reel feeding into the photoprinting station, it is contemplated that the webbing may be fed directly into the photo-printing station from the preparing or treating apparatus which coats the webbing.

When the webbing 14 is advanced a predetermined length so it is located in proper position with respect to the photo-printing frames, the pistons of air cylinders 23 are driven rearward to close the front frame back onto the rear frame snugly. Concurrently, vacuum is applied into the grooves or slots on the inner faces of the frames in order to draw the glass masters into tight fitting contact with the webbing therebetween. Gaskets which are suitably positioned on these inner faces of the frames serve to seal the frames together to prevent leakage of the vacuum. Although in general the gaskets are made of a compressible rubber, where the gaskets come into contact with the metallic webbing it has been found preferable to cover them with a very thin protective sheet of metal, such as stainless steel, to protect against wear of the rubber gaskets by the metallic webbing as it is pulled through. It has been found that a thin sheet of stainless steel, ranging in the order of .0005 to .002 inch thick, provides adequate protection while at the same time it has sufficient flexiblty so that when the frames are drawn down to one another, the stainless sheet still provides adequate sealing against loss of vacuum. In practice it has been found important to make sure that the glass masters are in flat contact with the metallic webbing so that no ripples or creasings occur in the webbing. This is to ensure that the patterns are photoprinted onto the webbing with the desired precision. Generally the vacuum is applied to the drawn-together frames for a predetermined period of time to ensure that this closed contact is obtained before exposure. After this vacuum draw-down time, the carbon arc lamps 17 located both at the front and back of the frames are energized to project their actinic light onto the webbing located between the frames through the respective front and back master plates 25. The period of time for exposure is, of course, dependent upon various factors and can be readily determined by those of ordinary skill and knowledge in the art. Suffice it to point out that light of sufficient intensity is projected for a predetermined period of time to adequately photoprint the desired patterns onto the light sensitized metallic webbing. After the exposure time has elapsed, the carbon arc lamps are turned off by electrical controls and the vacuum is shut off. Pressurized air is applied between the frames for a brief instant to aid in breaking the tight vacuum seal. The application of the pressurized air produces a uniformly smooth but positive opening of the frames instead of a sudden jerking motion. This aids in maintaining reliable operation of the mechanism for a long period of time. Concurrently, the pistons of the air cylinders 23 are driven in a forward direction to again swing the front frame 24 away from the rear frame 26 so that the webbing 14 can then be advanced into the next position as a new cycle is initiated. All of the stations in a multiple station system, such as the three stations illustrated in FIG. 1, operate in the same manner concurrently with one another so that the patterns are photoprinted concurrently in multiple locations on the elongated webbing.

In order to optimize production rates while still economizing on material to minimize the amount of unused webbing, the spacing between the stations in a downstream direction is chosen such that the center-to-center distance between the desired patterns in adjacent stations is substantially equal to twice the diameter of the circular pattern to be photoprinted, as represented by the shade lines at 25. In practice the center-to-center distance is held to twice the pattern diameter with a tolerance of plus or minus .025 inch. This means essentially that the spacing between each of adjacent stations is just enough to carry or have printed thereon the desired pattern. Looking at this another way, it can be seen that the webbing extending between the rightmost side of station 12 to the leftmost side of station 10 is long enough to contain five patterns photoprinted on contiguous sections, whereas only three photoprinting stations are located in this length. In order to eliminate waste of material that would occur if the webbing were advanced completely through the three stations during each cycle, the patterns are photoprinted on contiguous sections by advancing the webbing in a unique manner. Instead of advancing the length of the webbing 14 completely through the three photo-printing stations during each cycle thereby using up for three patterns enough material on which five patterns could be photoprinted, the webbing is advanced a length which is equal to the length necessary to photoprint the pattern on three contiguous sections. In other words, the section of webbing on which station 10 photoprints is advanced to a location between stations 11 and 12 so that at the next following photoprinting cycle it is not subjected to any further exposure since it is covered by the curtain 21. In a similar manner and at the same time, the section of the webbing which was located between stations 10 and 11 was not exposed and is advanced into station 12 so that during the next photoprinting cycle a pattern is printed thereon. That section of the webbing on which station 11 had photoprinted is advanced to the right of station 12 which is beyond the photoprinting section and is not thereafter exposed. It can be seen then, that in this manner the desired circuit patterns are photoprinted on contiguous sections of the light sensitized webbing for optimum production rates with minimum waste of material. Although the described embodiment comprises three photoprinting stations, it is contemplated that a larger number of stations can be utilized and the webbing advanced in a similar manner to achieve the same optimum conditions. For example, a nine station system has been constructed with spacings and cyclical advancement of the webbing selected to produce photoprinted patterns on contiguous sections of the elongated webbing in the same manner as heretofore described.

Although the cycle of operation has been described only with respect to a single station, obviously all the stations in a multiple station system, as contemplated by this invention, would operate from a master control concurrently in the same manner. Although a single set of controls with appropriate connecting lines to each of the individual stations would serve for all stations, it is preferable that each station has its own separate set of control mechanisms which are coordinated with one another by a master control. In the event of a failure at any one of the stations, the complete system does not have to be shut down since the other stations can remain in operation. A new station with its own set of controls can be brought into operation while the defective one is being repaired.

Figure 4:
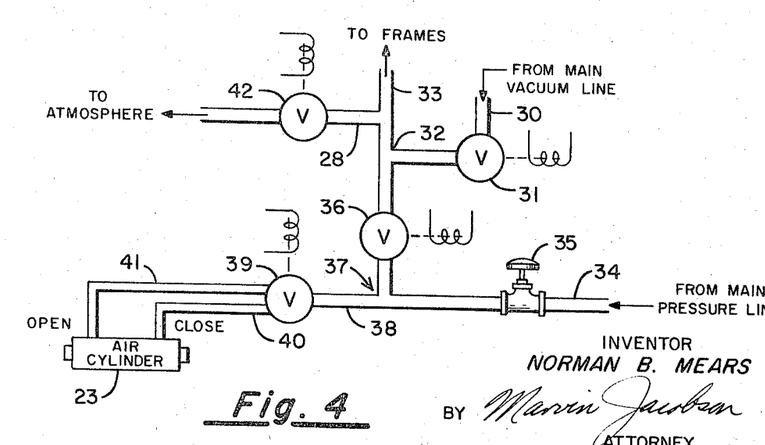
FIG. 4 is a schematic illustration of the hydraulic (air) control of the system illustrated in FIGS. 1 and 2.

FIG. 2 shows the detail of the physical layout of the electrical and hydraulic lines and controls which are incorporated into each of the stations to operate them in the manner described. FIG. 4 is a simplified schematic illustration of the hydraulic (air) flow.

Vacuum from a main vacuum supply line, not shown, is carried by conduit 30 through a solenoid operated valve 31 and T-connection 32 and up elongated tubing 33 which is coupled to the frames to apply the draw-down vacuum to the master plates. Pressurized air is fed in from a main pressure line, not shown, through an input conduit 34 and hand operable shut-off valve 35 and solenoid operated valve 36 until it joins conduit 30 at T-connection 32. Pressurized air is tapped off the input conduit 34 at 37 and passes through conduit 38 into a double acting solenoid controlled valve 39. The two output conduits 30 and 41 from valve 39 carry the pressurized air to air cylinders 23 which control the opening and closing of the frames. A safety device 27 (not shown in FIG. 4) is interposed in conduit 38 between its input and the double acting solenoid valve 39. Between the T-connection 32 and its point of attachment to the frame, conduit 33 is joined by a short piece of conduit 28 which is connected to another solenoid operated valve 42. The latter, when energized, is open to the atmosphere and can be used in this way to change the pressure in conduit 33 to atmospheric. This is what is commonly referred to as "dumping" the vacuum.

The electrical control lines for each of the solenoid valves 36, 39, 31 and 42 are respectively 43, 44, 45 and 46 all emanating from electrical junction box 47. Any coordinating electrical control signals between stations from a master control as well as the main power supply energy are fed into the stations via the cable 48.

At the start of a cycle of operation of the station, a suitable electrical control signal is fed via line 44 to solenoid 39 to open the flow path between conduit 41 and conduit 38 thereby providing pressurized air to cylinders 23 causing the latter to swing the front frame 24 away from the rear frame 26 as previously described. After a suitable period of time during which the webbing is drawn through the frames and properly located, another electrical control signal comes through the same electrical line 44 to reverse the condition of the valve 39 so as to close line 41 and open the flow path of conduit 40 to conduit 38. This causes the air cylinders 23 to drive the two frames back together. Substantially concurrent therewith, an electrical signal on line 45 energizes the solenoid controlled valve 31 to apply vacuum through conduit 30, T-connection 32 and conduit 33 to the frames between their facing surfaces to draw the masters down tightly into contact with the opposite sides or surfaces of the webbing between the frames. The station is maintained in this condition for a suitable period of time during which the vacuum draw-down is completed and the arc lamps energized to photoprint the pattern images onto the webbing surfaces. At the completion of the photoprinting step, the electrical signal is terminated on line 45 so that the solenoid operated valve 31 closes cutting off the vacuum supply to conduit 33. Substantially concurrent therewith a short duration electrical signal is applied via line 43 to solenoid operated valve 36 to allow a blast of pressurized air to pass from conduit 34 into conduit 33 to help break the tight seal between the two frames. At almost the same time but delayed a brief moment, valve 39 is again reversed in condition so that pressurized air is fed to the air cylinders 23 to once again swing the frames open allowing the webbing to be advanced into position for another cycle of operation.

Figure 5:
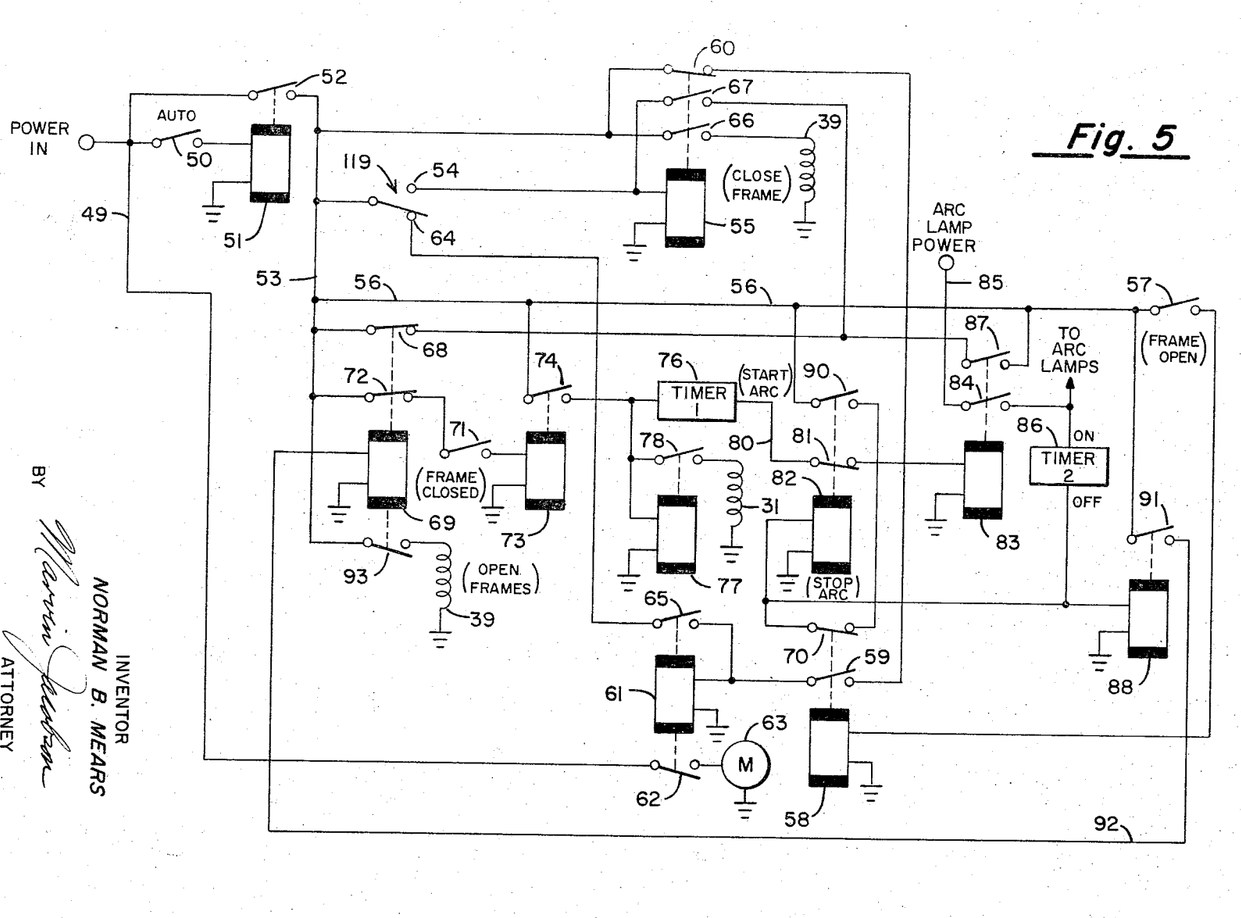
FIG. 5 is a schematic illustration of the electrical control for the system shown in FIGS. 1 and 2.

The electrical schematic of the control for the system and one of the stations is illustrated in FIG. 5. During the course of the description of the operation it will become obvious which portion of the electrical circuitry is common to all of the stations to provide the proper synchronization and which portion is contained in each of the individual stations. It should also be recognized that only that portion of the electrical circuitry which is necessary for normal operation of the system in an automatic manner is illustrated and described herein. Safety features and facilities for operating the system in a step-by-step manner under control of manual push buttons are not shown or described but are preferably incorporated into the electrical circuit for test purposes. The operation of the electrical control system can best be described by going through one cycle of operation in a step-by-step manner. In this instance we will assume that the cycle is initiated while the frames are open and the webbing is being advanced therebetween. In FIG. 5 the coils for the respective solenoid operated valves of FIG. 4 are identified with the same item number as in FIG. 4.

Electrical power is applied to the system by closing the manually operable switch 50 by setting it in the automatic position to energize relay 51. Closing of the normally open contact 52 provides the electrical energy from the main power bus into bus 53. The normally open contact 54 of switch 119, which is preferably a microswitch, prevents relay 55 from energizing at this time. As will be subsequently explained, switch 119 is suitably mounted on a supporting structure and is operated to indicate that the webbing is properly indexed, that is, that the webbing is in the proper position with respect to the photoprinting stations so that it is correctly located for photoprinting the patterns on contiguous areas as previously described. The structure of the sensing switch 119 is a matter of choice and can be of different types, for example, a photo relay that senses when the webbing has been advanced to the proper position or a snap action microswitch which operates off the mechanism which advances the webbing through the stations. Other arrangements for sensing proper indexing of the webbing are well known in the art and can be readily incorporated into this system.

Coming off bus 53 conductor 56 carries energy through the switch 57 which is in the closed position whenever the frames are fully open. This energy is then applied to relay 58 so that its normally open contact 59 is closed. Energy from bus 53 passes through the normally closed contact 60 of relay 55 through the now closed contact 59 of relay 58 to energize relay 61 so that its normally open contact 62 is closed. This permits motor 63 to continue driving thereby advancing the webbing in the desired manner through the photoprinting stations. Relay 61, once it has been energized, is locked in through a self latching feature comprising the series circuit of normally closed contact 64 for sensing switch 119 and the normally open contact 65 which is closed when relay 61 is energized. This provides energy from the bus 53 to maintain relay 61 in the energized condition.

When the webbing has advanced to its proper location, the proper indexing is sensed by switch 119 so that its normally open contact 54 closes and the normally closed contact 64 opens. The former results in energizing relay 55 and the latter breaks the latching circuit to relay 61 even though relay 61 may still be momentarily energized through its alternate path. When relay 55 becomes energized, current is applied through the now closed normally open contact 66 from bus 53 to energize the solenoid operated valve 39 so as to provide pressurized air to conduit 40 (FIG. 4) to close the frames. At the same time, relay 55 is latched in the energized condition through the now closed normally open contact 67 in series connection with the closed contact 68 of relay 69 to bus 53. Additionally, the normally closed contact 60 is opened thereby breaking the energizing path from bus 53 to relay 61 so that it drops out or goes to the deenergized condition thereby stopping the motor 63. When the frames are driven closed, which occurs very rapidly due to the virtual instaneous response of the air cylinders 23, switch 57 opens thereby removing any actuating energy from relay 58 so the latter drops out to open contact 59 and close contact 70. The condition of the frames being closed together is sensed by the normally open switch 71 so that energy is provided from bus 53 through normally closed contact 72 of relay 69 and switch 71 to energize relay 73. The latter is constructed to have an inherent time delay between the application of energy and the operation of the relay contacts to ensure that adequate time has been allowed for the necessary preliminary actions to have taken place before the steps which are controlled by relay 73 are initiated. After this short period of delay, the normally open contact 74 closes so that energy is provided from bus 53 through conductor 56 and contact 74 into timer 76 and by a parallel path to relay 77. The energized relay 77 closes the normally open contact 78 to energize solenoid 31 which applies vacuum from the main vacuum line to the frames (FIG. 4). This is the start of the vacuum draw down time to bring the master plates in contact with the respective surfaces of the webbing prior to photoprinting the desired pattern. The timer 76 may be of any construction well known in the art which is initiated upon the application of a signal input and will provide an output signal after a predetermined period of delay. This delay time is incorporated to ensure that the vacuum draw down time is of sufficient duration so that the master plates make the desired contact with the webbing. After this predetermined period of time to allow sufficient drawdown, the output of the timer 76 appearing on conductor 80 is applied through normally closed contact 81 of relay 82 to energize relay 83. When relay 83 energizes and closes its normally open contact 84, power is applied from bus 85 to the arc lamps (not shown). This power, or some small portion thereof, is also applied as an input signal to another timer 86 which is similar in construction to timer 76 and provides a delayed output after a predetermined period of time. Timer 86 serves to control the length of time or duration of the exposure of the webbing to the actinic light from the arc lamps to photoprint the pattern. The normally open contact 87 of relay 83 is also closed to provide a parallel latching path from bus 53 through conductor 56 back through contact 67 to the coil of relay 55. After the preset suitable period of time the output of timer 86 is applied to relay 88 which is similar in construction to relay 73 since it also has a short inherent time delay. At the same time, energy is applied to the input of relay 82 so that it becomes energized to open contact 81 thereby deenergizing relay 83 and opening the circuit input to the arc lamps. The normally open contact 90 of relay 82 closes to provide a latching circuit from conductor 56 through the closed contact 70 of relay 58 back into the coil of relay 82. It can be seen that when relay 58 becomes energized, it opens the self latching circuit for relay 82.

Contact 91 of relay 88 is closed when the latter is energized so that energy is provided from bus 53, through conductor 56, contact 91 and conductor 92 to energize relay 69. This relay serves a three-fold function: (a) it opens the latching circuit for relay 55 from bus 53 through contact 68; (b) it removes the energy which is applied from bus 53 to relay 73 through contact 72 thereby removing the input to the timer 76; and (c) it closes contact 93 so that energy is applied from bus 53 to the solenoid valve 39 to reverse its operative condition so that pressurized air is allowed into conduit 41 where it is carried to air cylinder 23 (FIG. 4) to open the frames. When the frames are driven fully open the condition that was described at the beginning of this cycle of operation occurs. That is, relay 58 is energized from bus 53 through conductor 56 and switch 57 which in turn closes the energizing path to relay 61 through contact 60 of relay 55 to energize drive motor 63 through contact 62 so that the webbing is once again advanced through the photoprinting stations.

Figure 6:
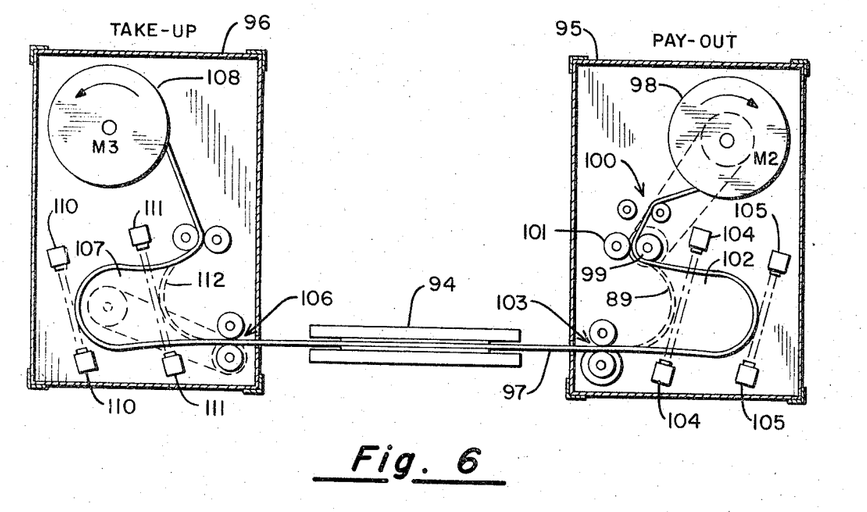
FIG. 6 is a diagrammatic illustration of the overall drive system for advancing the webbing in a single station system.

FIG. 6 is a top view which diagrammaticaly illustrates the drive system for advancing the webbing into and through the photoprinting stations. For clarity only a single station is shown at 94 although obviously the number of photoprinting stations between the source or payout cabinet 95 and the output or takeup cabinet 96 is a matter of choice. The webbing 97 is uncoiled from a supply reel 98 in the payout cabinet 95 which is driven by a motor (not shown) which is also belt coupled (illustrated by shadow line) to drive roller 99. The webbing, upon leaving the supply reel 98, passes through a first set of guide rollers at 100 and between the motor driven roller 99 and a pinching idler roller 101. Roller 99 being driven at a speed somewhat faster than the supply reel 98 serves to keep the webbing in a taut condition as it is being unreeled. From there the webbing makes a loop at 102 before passing through another pair of rollers at 103. The latter serves a dual purpose in acting as a brake to keep the webbing taut as it leaves payout cabinet 95 and at the same time provides upper and lower guide flanges (not shown) to keep the webbing straight.

Two pair of phototube sensing devices, 104 and 105 respectively, are suitably mounted in the payout cabinet 95 to control the operation of the payout drive motor which drives the reel 98 in accordance with the size of the loop 102. When sufficient webbing has been uncoiled from the reel 98 to form a large loop, such as shown in heavy lines in FIG. 6, the light circuit of both sets of phototubes is interrupted which results in the payout drive motor being deenergized so no further webbing is fed from reel 98.

When the loop 102 is reduced by webbing being coiled up at the takeup cabinet 96, in a manner to be described shortly, to a condition as illustrated by the dashed line 89 in FIG. 6, the light circuits between both pairs of sensing elements 104 and 105 are clear which results in the payout drive motor being energized so that reel 98 feeds out additional webbing.

At the other side of the photoprinting frames 94, the webbing 97 enters the takeup cabinet 96 via a first pair of guide rollers at 106 one of which is motor driven as illustrated by shadow line showing belt or chain drive. In a manner similar to that in the payout or source cabinet 95, the webbing makes a loop 107 which varies between a relatively large size illustrated in FIG. 6 by the heavy line and a relatively small size illustrated by the dashed line 112. A takeup reel at 108 is motor driven. When the webbing forms the larger loop, the light circuits between the pairs of phototube sensing elements 110 and 111 are interrupted to close the electrical circuit to the takeup drive motor which drives reel 108 to coil up the webbing. This reduces the size of loop 107 to the condition illustrated by the dashed line 112. When the latter occurs, the light circuit is open between both sets of sensing elements 110 and 111 so that the electrical circuit to the takeup drive motor is opened to terminate rotation of the reel 108.

Figure 7:
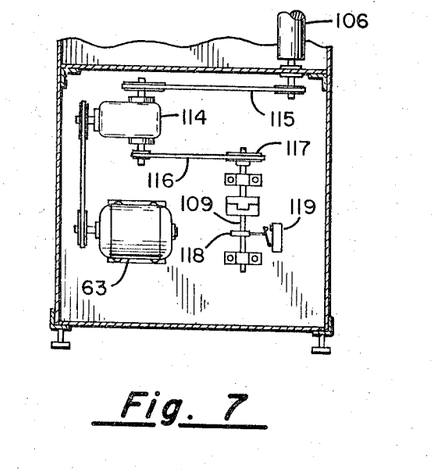
FIG. 7 is a diagrammatic illustration of the drive and controls for the take-up reel illustrated in FIG. 6.

A third motor for controlling the advance of the webbing through the printing station 94 is located in the lower part of the takeup cabinet 96, as is illustrated in FIG. 7. This motor 93 (see electrical schematic in FIG. 5) drives the input rollers at 106 through suitable mechanisms such as gear clusters 114 and belt 115. Another drive belt 116 couples the gear cluster 114 to a pulley 117 which drives shaft 109. Cam 118 mounted on shaft 109 rotates with the latter to control the operation of microswitch 119. The momentary acting normally open and normally closed contacts of the latter are, respectively, contacts 54 and 64 (FIG. 5). These contacts sense the correct index position of the webbing within the photoprinting station as previously described. In other words, at the instant that motor 63 has driven roller 106 sufficiently to advance the webbing through the photoprinting station a predetermined length, cam 118 acts on switch 119 to momentarily close the normally open contact 54 and momentarily open the normally closed contact 64. This can be considered as the starting point for each cycle of operation. Motor 63 is deenergized by contact 64 opening, but has sufficient override before stopping so that the contacts on the associated microswitch are only momentarily affected by cam 18. Mechanisms are further included to ensure that each revolution of cam 118 is always initiated from the same starting point so that the same length of webbing is indexed into the photoprinting station during each cycle.

Patents issued to N. B. Mears which described in detail mechanisms and processes for treating and handling continuous metal webs in the mass production of precision metal articles using photographic reproduction and etching techniques are the following: 2,710,591; 2,710,814; 2,720,146; 2,751,829; 2,762,149; 2,786,443; 2,791,514; 2,814,974, and 2,822,635.

Among the precision articles of manufacture which may be produced are fine mesh sieves or screens, reticles for fire control equipment, electric circuits and particularly aperture masks for television picture tubes. Typically, a TV tube mask consists of a thin sheet of metal containing apertures having diameters ranging from .0119 to .015 inch arranged in a circular pattern up to about 17 inches in diameter. The center-to-center spacings between the apertures is in the order of .02720 inch so the degree of precision which must be maintained while mass producing these articles is apparent.

A variation contemplated in the operation of this invention is to manually control the drive means which advances the webbing through the photoprinting stations. This can be done by manipulation of push-button switches or the like to selectively operate the drive motors or clutches. In this manner, the webbing can be "jogged" into position within the photoprinting stations and the advance of the webbing selectively controlled. When operated in this manner the invention may be more versatile since the number of photoprinting stations in operation can be changed at will depending upon the desired rate of production. Furthermore, the operator can continuously visually inspect the webbing as part of quality control.

What is claimed is:

1. Apparatus for automatic photoprinting of circuit patterns on a continuous elongated web of light-sensitized material, comprising: at least one photoprinting station containing images of patterns to be printed on opposite sides of a continuous web; drive means for advancing the web longitudinally through said station; control means for operating said drive means in a cyclical stop-go manner; and means responsive to said control means for initiating photoprinting of said patterns in register on opposite sides of said web at said station when said drive means is in the stop condition.

2. The invention as described in claim 1 wherein said control means controls the operation of the drive means to advance the web so that said patterns are printed on contiguous sections lengthwise of said web.

3. Apparatus for photoprinting patterns on a continuous elongated web of light-sensitized material, comprising: a plurality of photoprinting stations separated from each other a predetermined distance along the direction of travel of a continuous web, each station containing images of patterns to be printed on opposite sides of said web; drive means for advancing said web lengthwise; control means for operating said drive means in a cyclical manner so that said drive means bring unexposed sections of the web to temporary rest in the respective photoprinting stations; and means operatively responsive to said control means for concurrently photoprinting patterns in register on opposite sides of the web on sections of said web when they are temporarily resting in said stations.

4. Apparatus as in claim 3 comprising: at least three photoprinting stations, each for photoprinting patterns on opposite sides of the web having identical outer dimensions; the center-to-center spacing between said stations being substantially equal to twice the width of said patterns, whereby said stations print patterns on contiguous sections of said web as the web advances.

5. Apparatus for photoprinting patterns on a continuous elongated web of light sensitized material comprising: at least three photoprinting stations, each containing pattern images to be photoprinted in registration on opposite sides of the web, said stations located in spaced-apart relationship along the direction of travel of said web; cyclical driving means for advancing said web through said photoprinting stations in a repetitive stop-and-go manner; and means operatively associated with said driving means for activating all of said photoprinting stations to concurrently photoprint the respective patterns in register on opposite sides of the web at the respective stations when the web is in the stop condition.

6. The apparatus as described in claim 5 wherein said driving means advances said web in a manner such that the photoprinting stations print said patterns on substantially contiguous sections along the web.

7. The invention as described in claim 4 wherein said photoprinting stations each include a pair of photoprinting frames containing pattern images to be photoprinted in registration on opposite sides of said web.

8. The invention as described in claim 7 wherein the center-to-center distance between the pairs of frames of adjacent photoprinting stations is at least twice the width of the respective patterns.

9. The invention as described in claim 7 wherein said control means includes means coordinated with the relative locations of said photoprinting stations for controlling the drive means to position any given section of the web only once within any photoprinting station when the drive means is in the stop condition.

10. Apparatus as in claim 4 wherein said control means includes: means for sensing when the web is in a predetermined position with respect to said photoprinting stations; and first means responsive to said sensing means for at least momentarily stopping said drive means.

11. Apparatus as in claim 10 further including preset adjustable timing means for initiating and controlling the length of time of operation of the photoprinting means.

12. Apparatus as in claim 11 further including second means responsive to said sensing means for actuating said timing means; and means coupled between said timing means and said control means for causing the latter to start said drive means at the end of the photoprinting time.

13. The invention as described in claim 12 wherein: said photoprinting frames at each station are pivotally joined together and said photoprinting means contains means for swinging the frames open when the drive means is started and for swinging the frames closed at the start of the photoprinting operation.

14. The invention as described in claim 12 wherein: said photoprinting frames are in a vertical plane hinged together at their top edge and said drive means advances the webbing on edge in a vertical plane between said frames.

15. Apparatus for automatic photoprinting of circuit patterns on a continuous elongated web of light sensitized material comprising: a plurality of photoprinting stations containing images of patterns to be printed in register on opposite sides of a light-sensitized web, said stations located in spaced-apart relation along the direction of travel of the web; drive means for advancing said web through said photoprinting stations; sensing means for sensing each time the web advances through the stations a predetermined length; first control means responsive at least in part to said sensing means for at least momentarily stopping said drive means; preset, adjustable timing means initiated by said first control means when said drive means is stopped for actuating all of said stations to concurrently photoprinting said patterns in register on opposite sides of said web; second control means responsive to said timing means for starting said driving means when the photoprinting is completed; the relationship of the distance between stations to the length of web advanced each cycle by the driving means being selected such that the printing stations print patterns only once on any section of said web while printing contiguous sections of the web.

16. Apparatus for automatically and repetitively photoprinting patterns on contiguous sections of an elongated web of light-sensitized material comprising: a plurality of pairs of photoprinting frames arranged side-by-side along the direction of travel of the webbing, each pair of frames containing images of patterns to be photoprinted in registration on opposite sides of an elongated light-sensitized webbing; said frames arranged in a vertical plane and pivotally joined together at their top edges; the center-to-center spacing between each adjacent pair of frames being substantially equal to twice the width of the patterns to be printed; driving means for feeding the elongated photosensitized webbing on edge lengthwise in a vertical plane through the pairs of printing frames; means for sensing when the webbing is located in a predetermined position with respect to said printing frames and for at least momentarily stopping said driving means; preset adjustable timing means operatively responsive to said sensing means for initiating a photoprinting operation concurrently at all of said photoprinting frames and for controlling the length of time of said photoprinting operation; means operatively responsive to said sensing means for closing the pairs of printing frames together at the start of the photoprinting operation; means operatively responsive to said timing means for opening the pairs of frames at the end of the photoprinting operation; and means responsive to said timing means for restarting the driving means at the end of the photoprinting operation.

References Cited by the Examiner
UNITED STATES PATENTS

| 2,989,910 | 6/1961 | Callaway et al. | 95—75 |
| 3,212,396 | 10/1965 | Schwardt et al. | 88—24 |

NORTON ANSHER, *Primary Examiner.*

R. A. WINTERCORN, *Assistant Examiner.*